US011422603B2

(12) United States Patent
Kao

(10) Patent No.: US 11,422,603 B2
(45) Date of Patent: Aug. 23, 2022

(54) POWER SWITCH DEVICE

(71) Applicants: GIGA-BYTE TECHNOLOGY CO., LTD., New Taipei (TW); GIGAIPC CO., LTD., New Taipei (TW)

(72) Inventor: Chin-Jun Kao, New Taipei (TW)

(73) Assignees: GIGA-BYTE TECHNOLOGY CO., LTD., New Taipei (TW); GIGAIPC CO., LTD., New Taipei (TW)

( * ) Notice: Subject to any disclaimer, the term of this patent is extended or adjusted under 35 U.S.C. 154(b) by 0 days.

(21) Appl. No.: 17/246,739

(22) Filed: May 3, 2021

(65) Prior Publication Data

US 2021/0349514 A1 Nov. 11, 2021

(30) Foreign Application Priority Data

May 7, 2020 (TW) .................................. 109115270

(51) Int. Cl.
*G06F 1/28* (2006.01)
*G06F 1/26* (2006.01)
*H02J 4/00* (2006.01)

(52) U.S. Cl.
CPC ................ *G06F 1/28* (2013.01); *G06F 1/263* (2013.01); *H02J 4/00* (2013.01)

(58) Field of Classification Search
CPC ................ G06F 1/28; G06F 1/263; H02J 4/00
See application file for complete search history.

(56) References Cited

U.S. PATENT DOCUMENTS

| 5,119,014 A * | 6/1992 | Kronberg ............... H02H 9/001 307/41 |
| 10,459,510 B1 * | 10/2019 | Srinivas ............... H03K 17/693 |
| 2010/0146272 A1 * | 6/2010 | Centonza ............ H04W 12/122 713/168 |
| 2016/0105581 A1 * | 4/2016 | Hikichi .............. H04N 1/32741 358/1.14 |

* cited by examiner

*Primary Examiner* — Zahid Choudhury
(74) *Attorney, Agent, or Firm* — Idea Intellectual Limited; Margaret A. Burke; Sam T. Yip

(57) ABSTRACT

A power switch device includes a switch, a control unit, and a communication interface. The switch includes a power input terminal, which is configured to receive an external power; and a power output terminal, which is configured to output the external power. The switch normally remains open. The control unit is turned on when receiving the external power via the power input terminal, and transmits a start request via the communication interface. The control unit determines whether the communication interface receives a busy message within a delay time period. If the busy message is not received within the delay time period, the control unit controls the switch to be closed, and sets a start process time period. Within the start process time period, if the communication interface receives another start request, the control unit generates another busy message to respond to the another start request via the communication interface.

17 Claims, 15 Drawing Sheets

POWER SWITCH DEVICE

CROSS-REFERENCE TO RELATED APPLICATION

This non-provisional application claims priority under 35 U.S.C. § 119(a) to Patent Application No. 109115270 filed in Taiwan, R.O.C. on May 7, 2020, the entire contents of which are hereby incorporated by reference.

BACKGROUND

Technical Field

The instant disclosure relates to the start management of an electric device, and in particular, to a power switch device.

Related Art

When an electric device is started after powered on, an input current of the electric device is subject to a surge, resulting in a high peak value of the input current. In a computer system, a single power supply system is usually used to supply power to a plurality of electric devices. The above electric device may be a built-in device in a single computer host, or may be separate computer hosts, that is, even a plurality of computer hosts simultaneously supply power with a single power supply system.

The electric device automatically starts when being powered on. If a plurality of electric devices are started at the same time, the high peak values of the input current generated by the electric devices are superimposed, so that a total load of the power supply system forms an instantaneous large current superimposed by the high peak values. The instantaneous large current easily exceeds an upper load limit of the power supply system, so that an overload power-off protection mechanism of the power supply system is started to turn off the power supply system to stop the supply of power. A power failure either during start or during operation may cause hardware damage and data loss.

Therefore, after the overload power-off protection mechanism occurs, the computer system often needs to be detected and repaired for normal operation.

SUMMARY

In view of the above problems, the instant disclosure provides a power switch device, which can prevent a plurality of electric devices from simultaneously starting, to avoid transient overloading of a power supply system.

At least one embodiment of the instant disclosure provides a power switch device, including a switch, a control unit, and a communication interface. The power switch device is configured to connect a power supply system and an electric device. The switch includes a power input terminal and a power output terminal. The power input terminal is configured to receive an external power, the power output terminal is configured to output the external power, and the switch normally remains open. The control unit is electrically connected to the power input terminal and the switch to control the switch to be open or closed. The control unit is turned on when receiving the external power via the power input terminal, and the control unit is configured to generate a start request. The communication interface is electrically connected to the control unit and configured to transmit a start request and receive a busy message.

After the communication interface transmits the start request, the control unit determines whether the busy message is received within a delay time period. If the busy message is not received within the delay time period, the control unit controls the switch to be closed, and sets a start process time period.

Within the start process time period, if the communication interface receives another start request, the control unit generates another busy message to respond to the another start request via the communication interface.

In at least one embodiment of the instant disclosure, the control unit generates a start request after receiving a power-on command via the communication interface.

In at least one embodiment of the instant disclosure, if the communication interface receives the busy message within the delay time period, the control unit retransmits the start request via the communication interface.

In at least one embodiment of the instant disclosure, after the busy message is received, the control unit retransmits the start request via the communication interface after waiting for a waiting time.

In at least one embodiment of the instant disclosure, the waiting time is greater than one-half of the start process time period and not greater than two-thirds of the start process time period.

In at least one embodiment of the instant disclosure, the power switch device further includes a power conversion circuit electrically connected to the power input terminal. The control unit and the communication interface are indirectly electrically connected to the power input terminal via the power conversion circuit, and the power conversion circuit is configured to convert the external power to a power type required by the control unit and the communication interface.

At least one embodiment of the instant disclosure provides another power switch device, including a switch, a control unit, and a communication interface. The power switch device is configured to connect a power supply system and an electric device. The switch includes a power input terminal and a power output terminal. The power input terminal is configured to receive an external power, the power output terminal is configured to output the external power, and the switch normally remains open. The control unit is electrically connected to the power input terminal and the switch to control the switch to be open or closed. The control unit is turned on when receiving the external power via the power input terminal, and the control unit includes a controlling operating mode and a controlled operating mode. The communication interface is electrically connected to the control unit.

In the controlling operating mode, the control unit determines whether the communication interface receives a start request. After the start request is received, the control unit responds with a start permission via the communication interface and sets a start process time period. If another start request is received during the start process time period, the control unit does not respond to the another start request.

In the controlled operating mode, the control unit transmits a start request via the communication interface, and controls the switch to be closed after the start permission is received.

In at least one embodiment of the instant disclosure, in the controlling operating mode, the control unit controls the switch to be closed.

In at least one embodiment of the instant disclosure, in the controlling operating mode, the control unit continuously receives a plurality of start requests via the communication interface, and records the start requests in a to-be-started list in an order of receiving. The control unit generates a corresponding start permission according to the earliest received start request, responds to the earliest received start request with the start permission, and deletes the earliest received start request.

In at least one embodiment of the instant disclosure, in the controlled operating mode, after the communication interface transmits a start request, the control unit determines whether the communication interface receives the start permission within a waiting time period. If the start permission is not received within the waiting time period, the control unit retransmits the start request via the communication interface.

In at least one embodiment of the instant disclosure, the control unit sets a device identification code. In the controlled operating mode, the control unit adds the device identification code to the start request. When the start permission is received, the control unit determines whether the start permission includes the device identification code. If the device identification code is not included, the control unit ignores the start permission and determines that the start permission is not received.

In at least one embodiment of the instant disclosure, the control unit loads a group list, and a plurality of preset device identification codes are recorded in the group list. In the controlling operating mode, the control unit determines whether the device identification code included in the start request is consistent with one of the preset device identification codes. In case of inconsistency, the control unit ignores the start request and determines that the start request is not received.

In at least one embodiment of the instant disclosure, after the control unit is turned on when receiving the external power via the power input terminal, the control unit transmits an existence inquiry via the communication interface, and determines whether an existence response corresponding to the existence inquiry is received. If the existence response is not received, the control unit is set to the controlling operating mode.

In at least one embodiment of the instant disclosure, in the controlling operating mode, the communication interface receives the existence inquiry, and the control unit transmits the existence response via the communication interface.

In at least one embodiment of the instant disclosure, the control unit adds the device identification code to the existence inquiry. In the controlling operating mode, the control unit determines whether the device identification code included in the received existence inquiry is consistent with one of the preset device identification codes. In case of inconsistency, the control unit ignores the existence inquiry and determines that the existence inquiry is not received.

In at least one embodiment of the instant disclosure, in the controlling operating mode, the control unit adds the device identification code to the existence response. In the controlled operating mode, the control unit determines whether the device identification code included in the existence response is consistent with one of the preset device identification codes. In case of inconsistency, the control unit ignores the existence response and determines that the existence response is not received.

In at least one embodiment of the instant disclosure, the power switch device further includes a power conversion circuit electrically connected to the power input terminal, the control unit and the communication interface are indirectly electrically connected to the power input terminal via the power conversion circuit, and the power conversion circuit is configured to convert the external power to a power type required by the control unit and the communication interface.

In one or more embodiments of the instant disclosure, a plurality of power switch devices are sequentially turned on at an appropriate time interval (during a start process time period), so that each corresponding electric device can be turned on sequentially not simultaneously. Therefore, the power switch device of the instant disclosure can prevent the instantaneous output current of the power supply system from exceeding the upper current load limit, thereby preventing the power supply system from performing overcurrent shutoff protection. The plurality of power switch devices are turned on through collaborative operation, so that there is no need to dispose a centralized management device additionally, which can simplify the composition of a power management architecture. In addition, the power switch device can be quickly added to or removed from an existing group of power switch devices, which facilitates deployment and configuration of the electric device.

BRIEF DESCRIPTION OF THE DRAWINGS

FIG. 8A shows a current output load generated by the power supply system after the electric devices are turned on.

DETAILED DESCRIPTION

Terms "module" and "unit" used in the following description refer to an application-specific integrated circuit (ASIC), an electronic circuit, a microprocessor, a chip that executes one or more software or firmware programs, and a circuit design. The module is configured to perform various algorithms, transformations and/or logic processing to generate one or more signals. When the module is implemented by software, the module may serve as program code that can be read by the chip or the circuit design and implemented in a memory through execution of the program code.

Figure 1:
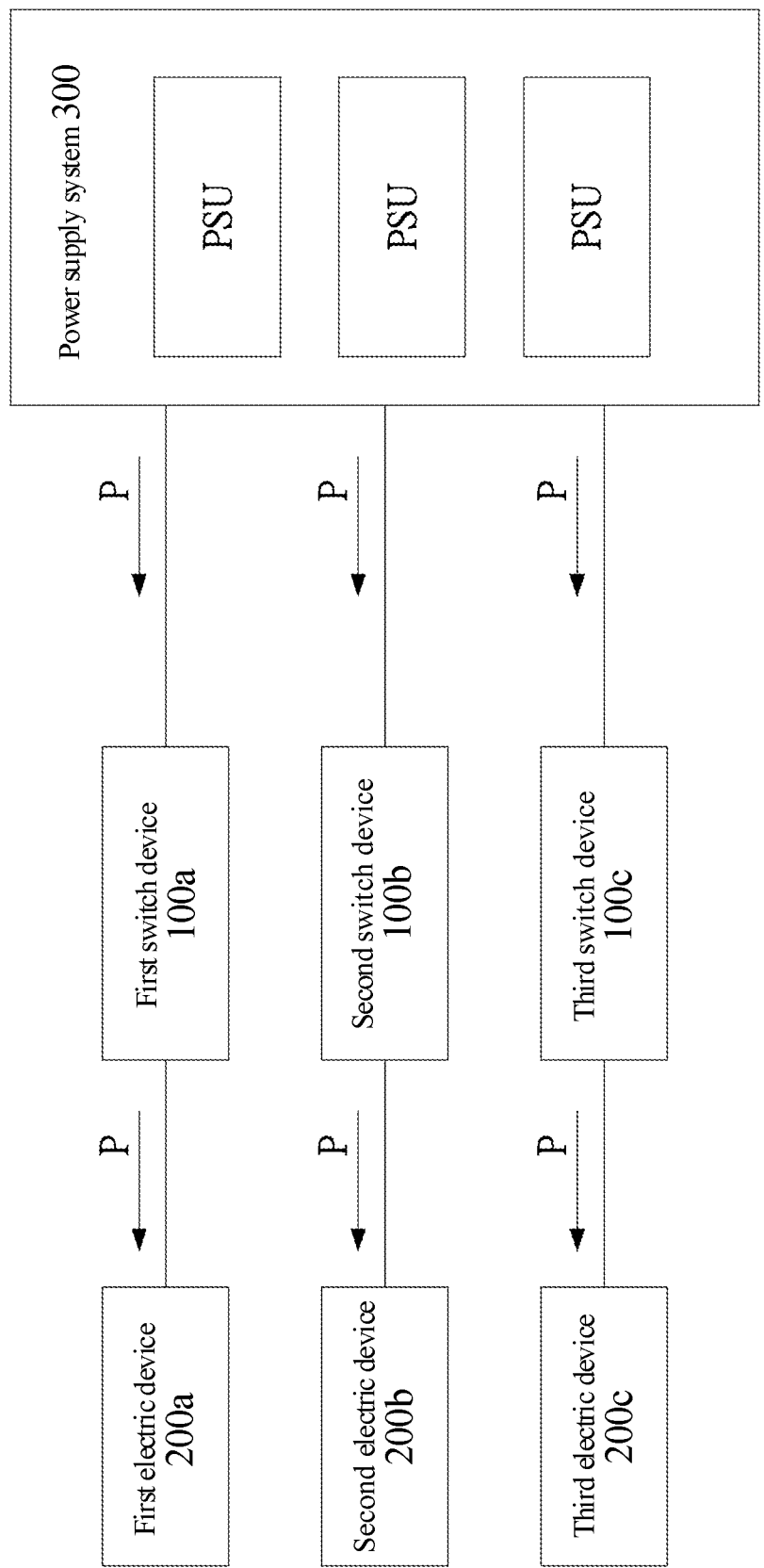
FIG. 1 is a schematic diagram of a plurality of electric devices connected to a power supply system via a power switch device according to a first embodiment of the instant disclosure.

As shown in FIG. 1, a power switch device 100a, 100b, 100c disclosed in the first embodiment of the instant disclosure is electrically connected to a power supply system 300. The power switch device 100a, 100b, 100c is electrically connected to an electric device 200a, 200b, 200c, respectively. Power outputted by the power supply system 300 is transmitted to the electric device 200a, 200b, 200c via the power switch device 100a, 100b, 100c. After receiving power via the power switch device 100a, 100b, 100c, the electric device 200a, 200b, 200c may start to perform a start process to be in an available state. The power supply system 300 may be a single power supply unit PSU, or may be a power array composed of two or more PSUs, or may be a power system in a building. For clarity, the power switch device 100a, 100b, 100c is divided into a first switch device 100a, a second switch device 100b, and a third switch device 100c, and the electric device 200a, 200b, 200c is divided into a first electric device 200a, a second electric device 200b, and a third electric device 200c in the following.

Figure 2:
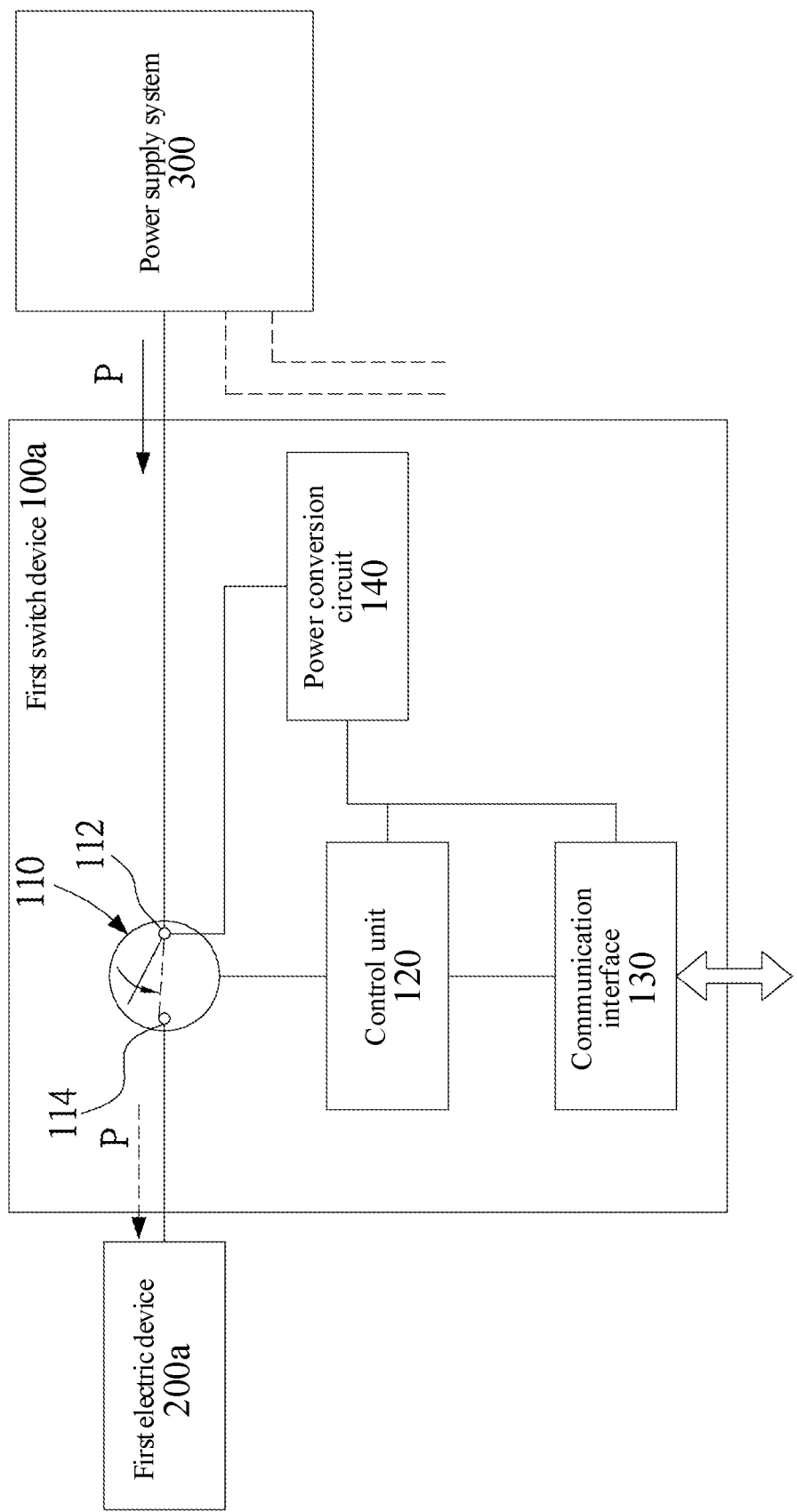
FIG. 2 is a block diagram of a power switch device according to one or more embodiments of the instant disclosure.

FIG. 2 is a circuit block diagram of a first switch device 100a of the first embodiment. The first switch device 100a includes a switch 110, a control unit 120, a communication interface 130, and a power conversion circuit 140. In an embodiment of the instant disclosure, the power switch device 100a, 100b, 100c substantially has the same composition.

As shown in FIG. 2, the switch 110 may be a transistor switch or a relay. The switch 110 includes a power input terminal 112 and a power output terminal 114. The power input terminal 112 is electrically connected to the power supply system 300 via a cable and is configured to receive an external power P from the power supply system 300. The power output terminal 114 is electrically connected to a power interface of the first electric device 200a via another cable or a flat cable. The power output terminal 114 is configured to output the external power P to the first electric device 200a.

Figure 3:
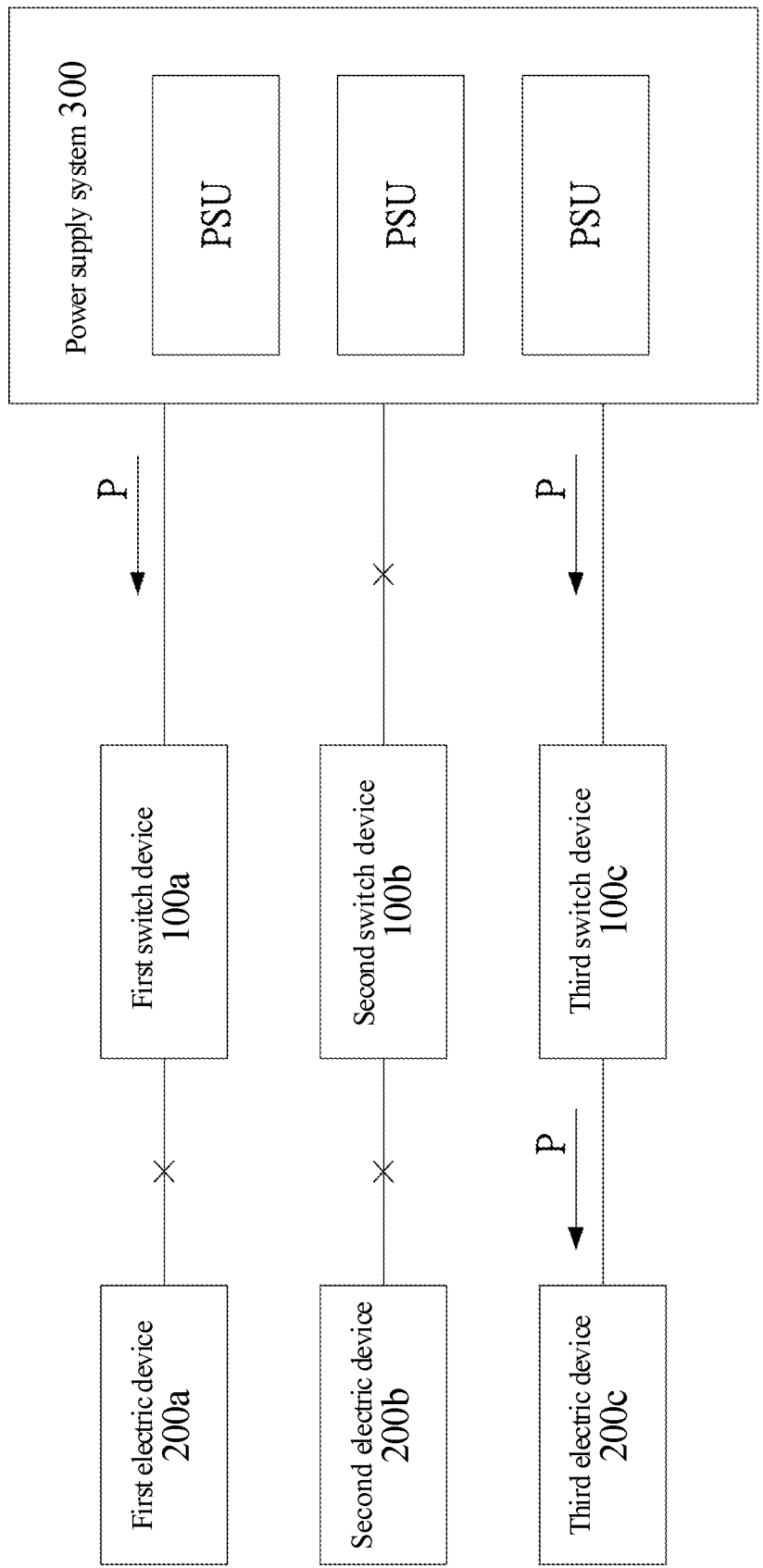
FIG. 3 and FIG. 4 are schematic diagrams of switching a connection status of the power switch device according to a first embodiment of the instant disclosure.

As shown in FIG. 2 and FIG. 3, the switch 110 normally remains open. When the power supply system 300 provides the external power P to the power input terminal 112, the switch 110 does not immediately output the external power P via the power output terminal 114, so that the first electric device 200a does not immediately receive the external power P to perform a start process.

As shown in FIG. 2, the power conversion circuit 140 is electrically connected to the power input terminal 112, and the power conversion circuit 140 is configured to convert the external power P to a power type required by the control unit 120 and the communication interface 130. The control unit 120 and the communication interface 130 are indirectly electrically connected to the power input terminal 112 via the power conversion circuit 140 to receive the converted external power P. The control unit 120 is also electrically connected to the switch 110 and is configured to control the switch 110 to be open or closed. The control unit 120 is turned on when receiving the external power P via the power input terminal 112, and the communication interface 130 also receives the external power P via the power input terminal 112 to serve as power required by operation. The communication interface 130 is configured to communicate with the outside, including transmit a request, an inquiry, or a response to the outside, and receive a request, an inquiry, or a response from the outside.

As shown in FIG. 2, the communication interface 130 may be a wireless communication interface that supports one or more wireless communication protocols. The above wireless communication protocol may be, but is not limited to, Bluetooth, Zigbee, Wi-Fi Direct, or other exclusive protocols. The communication interface 130 performs broadcasting or direct interconnection according to the wireless communication protocol to receive or transmit a request, an inquiry, or a response. The communication interface 130 may also be a wired communication interface, which is electrically connected to a local area network to receive or transmit a request, an inquiry, or a response from the local area network. The above control unit 120 and the communication interface 130 may be units that are independently configured, and may also be integrated into a part or all of a single module.

As shown in FIG. 2, FIG. 3, FIG. 4, and FIG. 5, when the power supply system 300 provides the external power P to the power input terminal 112, the first electric device 200a does not immediately receive the external power P to perform the start process. When the first electric device 200a needs to be turned on, the control unit 120 is triggered to generate a start request R, and transmits the start request R via the communication interface 130 in a manner of broadcasting or not specifying a receiving object. The control unit 120 determines whether the communication interface 130 receives a busy message B from the outside, as shown in steps S110 and S120.

Figure 4:
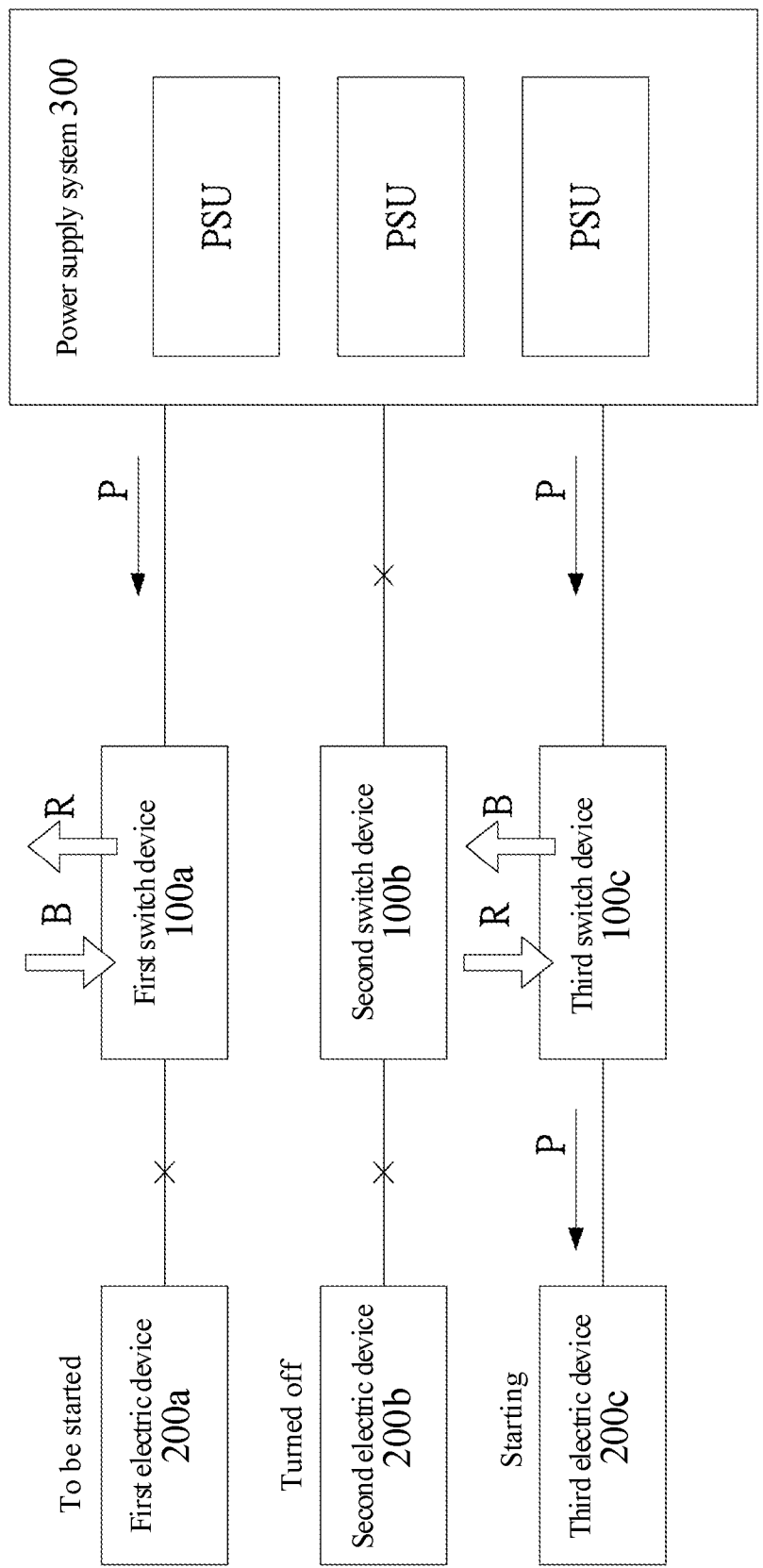

As shown in FIG. 4, the busy message B is transmitted by other power switch devices 100b, 100c electrically connected to the same power supply system 300. When the electric device 200a, 200b, 200c electrically connected to the power switch device 100a, 100b, 100c are performing a start process to perform enabling and initializing of various functions, the power switch device 100a, 100b, 100c transmits the busy message B when the start request R is received. For example, when the third electric device 200c is performing a start process, the third switch device 100c transmits the busy message B when the start request R of the first switch device 100a is received.

As shown in FIG. 2, FIG. 3, and FIG. 4, a method for triggering the control unit 120 may be starting, by the power supply system 300, to supply the external power P to the first switch device 100a via the corresponding output port when receiving an external instruction, so that the control unit 120 of the first switch device 100a is turned on when receiving the external power P. The control unit 120 automatically generates the start request R after being turned on. The power supply status of the power supply system 300 may also be switched via a manual switch electrically connected between the power supply system 300 and the first switch device 100a. Another way is that the power supply system 300 normally supplies power to the first switch device 100a, and the control unit 120 maintains the switch 110 to be open. The control unit 120 is triggered to generate the start request R after receiving a power-on command via the communication interface 130 or other pins.

Figure 5:
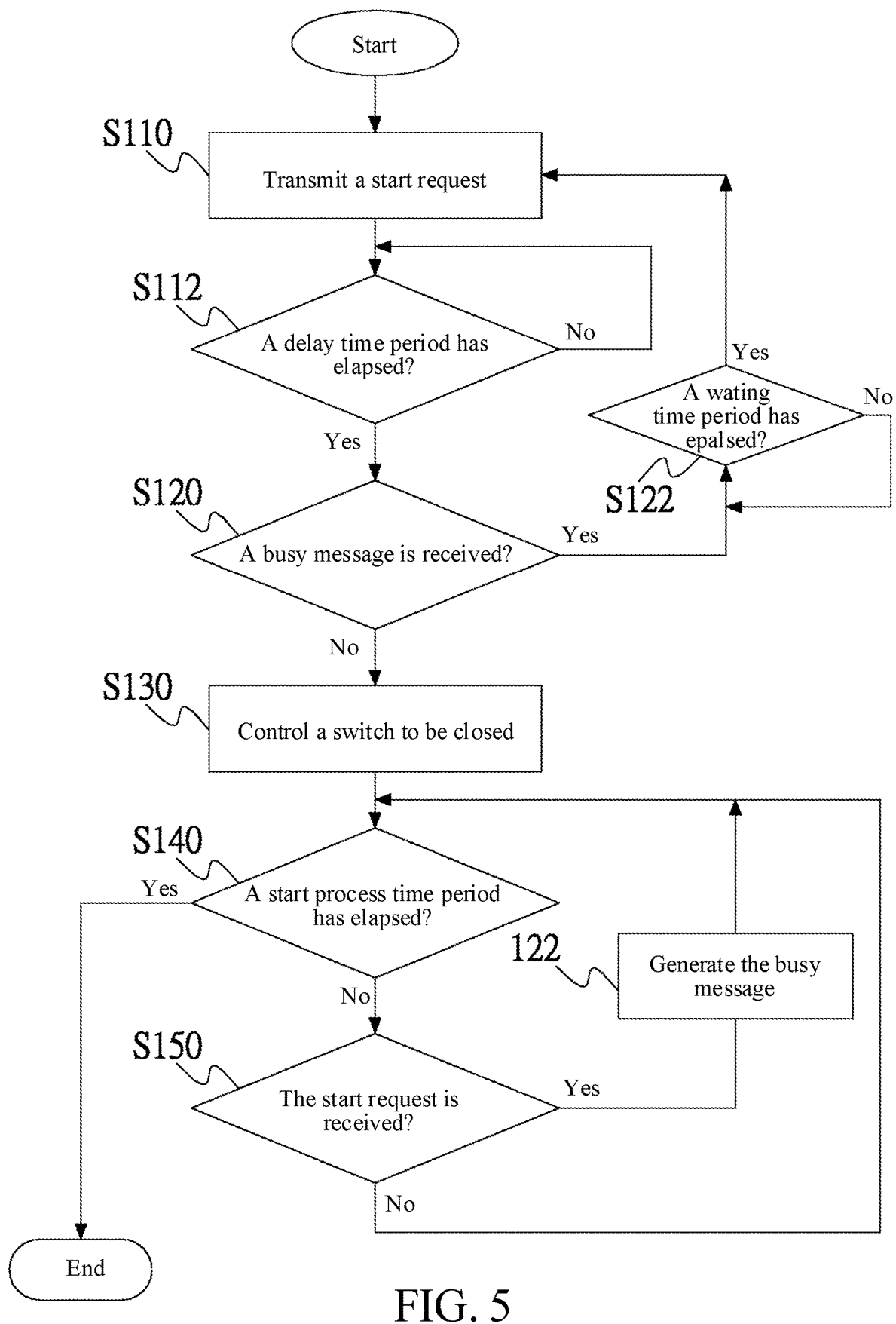
FIG. 5 is a flowchart of steps for switching a connection status of the power switch device according to the first embodiment of the instant disclosure.
Figure 6:
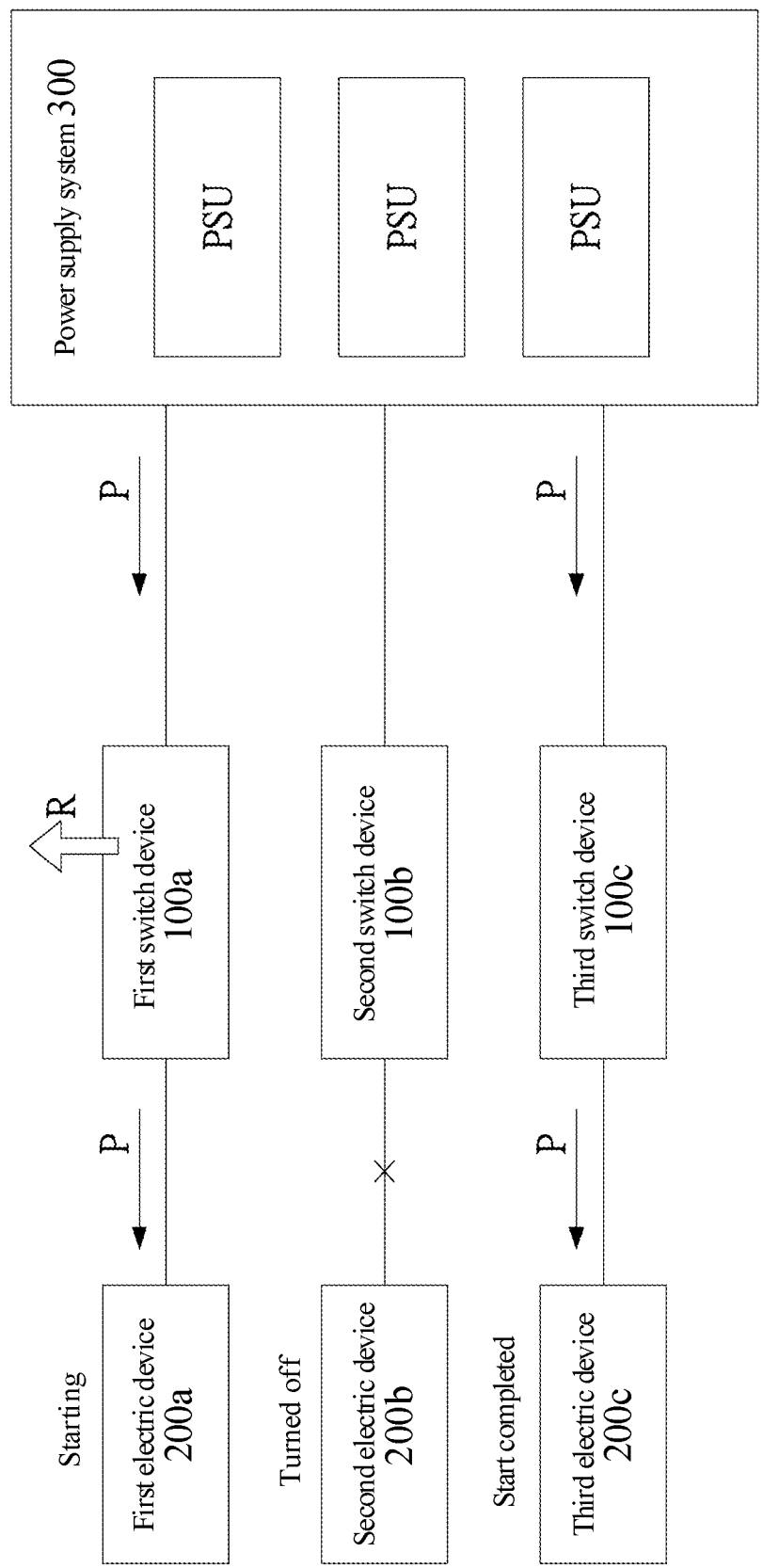
FIG. 6 and FIG. 7 are schematic diagrams of switching a connection status of the power switch device according to a first embodiment of the instant disclosure.

As shown in FIG. 2, FIG. 5, and FIG. 6, the control unit 120 sets a delay time period and waits for the delay time period shown in step S112. If the busy message B is not received within the delay time period, it indicates that other electric devices 200b, 200c have completed the start process or are being turned off. In this case, the control unit 120 controls the switch 110 to be closed to output the external power P to the corresponding first electric device 200a via the power output terminal 114, so that the first electric device 200a performs the start process, as shown in step S130. The control unit 120 also sets a start process time period and starts timing, as shown in step S140. The start process time period depends on time periods required by the electric devices 200a, 200b, 200c to actually perform a start process, which is generally set to be slightly greater than the time period required by the start process, and it is ensured that the time periods during which the electric devices 200a, 200b, and 200c perform the start process do not overlap.

As shown in FIG. 2, FIG. 4, and FIG. 5, when the first electric device 200a is ready to be turned on, other electric devices 200b, 200c may be in different states. For example, the second electric device 200b is turned off and not started, and the third electric device 200c is turned on earlier and is still performing a start process. After the communication interface 130 transmits the start request R, the third switch device 100c transmits the busy message B via the communication interface 130 of the third switch device for response. However, due to data processing, signal transmission, or other factors, the third switch device 100c may delay transmitting the busy message B. Therefore, the control unit 120 of the first electric device 200a needs to set a delay time period, and then determine whether the busy message B transmitted by the third switch device 100c is received after the delay time period has elapsed.

The delay time period may be set according to factors such as a speed at which the power switch device 100a, 100b, 100c processes information or communication quality of the surroundings. For example, if a time period from transmitting of the start request R to receiving of the busy message B by the communication interface 130 is 1 millisecond, the delay time period may be set to 2 milliseconds, to prevent the first switch device 100a of the first electric device 200a from immediately checking whether the power switch device 100b, 100c transmits the busy message B after transmitting the start request. However, in this case, the busy message B of the third switch device 100c may still be in the process of being transmitted, and therefore when other electric devices (such as the third electric device 200c) perform the start process, the first electric device 200a also performs the start process.

As shown in FIG. 2, FIG. 4, and FIG. 5, if the control unit 120 of the first switch device 100a determines that the communication interface 130 receives the busy message B within the delay time period, the control unit 120 does not control the switch 110 to be switched, and the control unit 120 regenerates the start request R, and retransmits the start request R via the communication interface 130.

As shown in FIG. 2, FIG. 4, and FIG. 5, if the start request R is retransmitted too frequently, the other power switch devices 100b, 100c need to frequently respond to the start request R. Therefore, after the busy message B is received, the control unit 120 may set a waiting time period, and then retransmit the start request R via the communication interface 130 after the waiting time period has elapsed, as shown in step S122. The waiting time period may be set to be greater than one-half of the start process time period, preferably not greater than two-thirds of the start process time period. In this way, in the start process of the second electric device 200b or the third electric device 200c, the number of times for which the second switch device 100b or the third switch device 100c responds to the start request R of the first switch device 100a may be reduced to the minimum, the first switch device 100a can also retransmit the start request R in time, so that the first electric device 200a can perform the start process.

Figure 7:
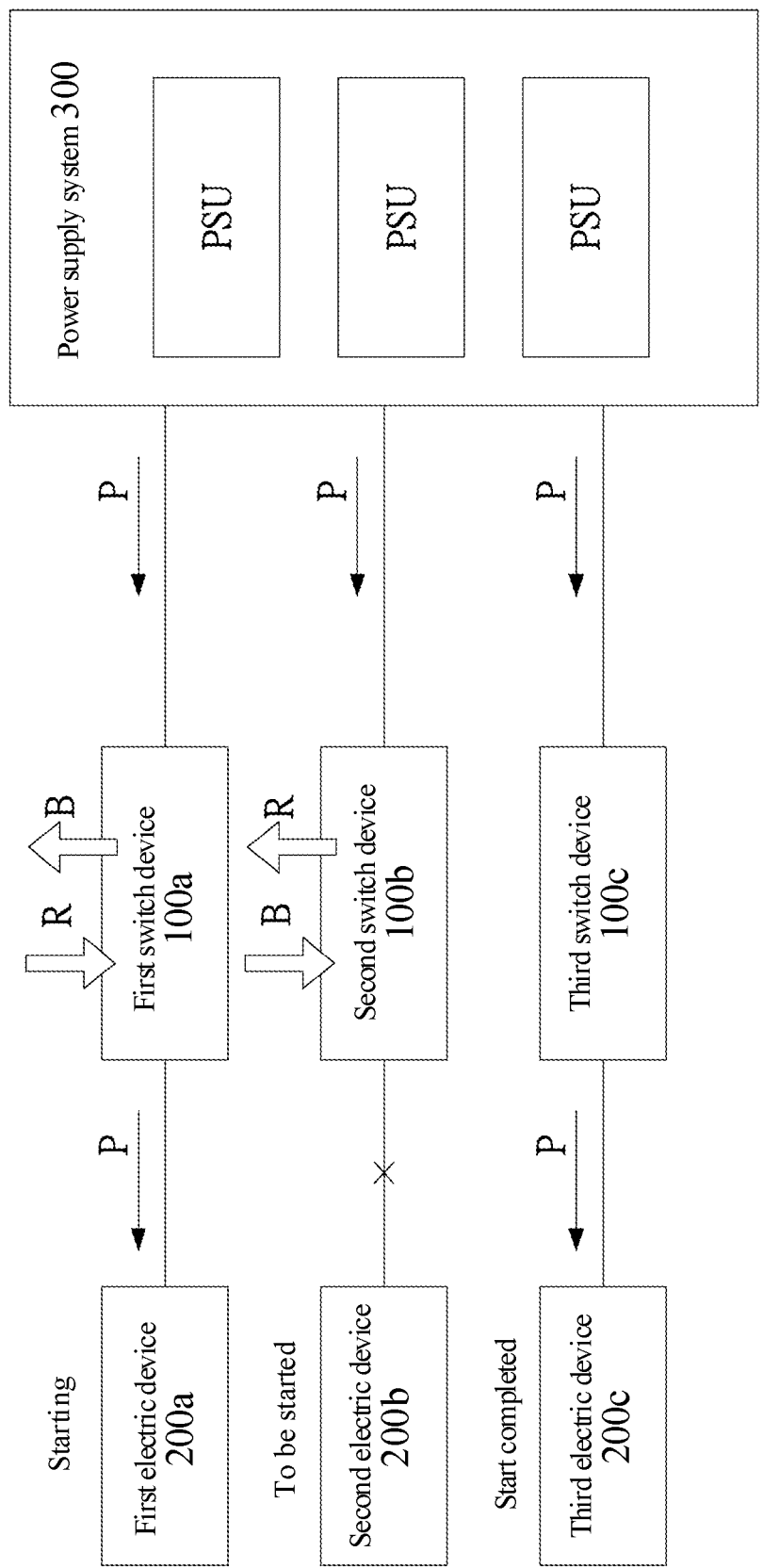

As shown in FIG. 2, FIG. 5, and FIG. 7, when the first electric device 200a performs the start process, the first electric device 200a may still be in a state of start process within the start process time period. In step S150, if the communication interface 130 of the first switch device 100a receives another start request R from the outside within the start process time period, for example, the start request R transmitted by the second switch device 100b, the control unit 120 of the first switch device 100a generates another busy message B to respond to the another start request R via the communication interface 130. The second switch device 100b waits after receiving the busy message B, and retransmits the start request R after the waiting time period has elapsed.

Figure 8A:
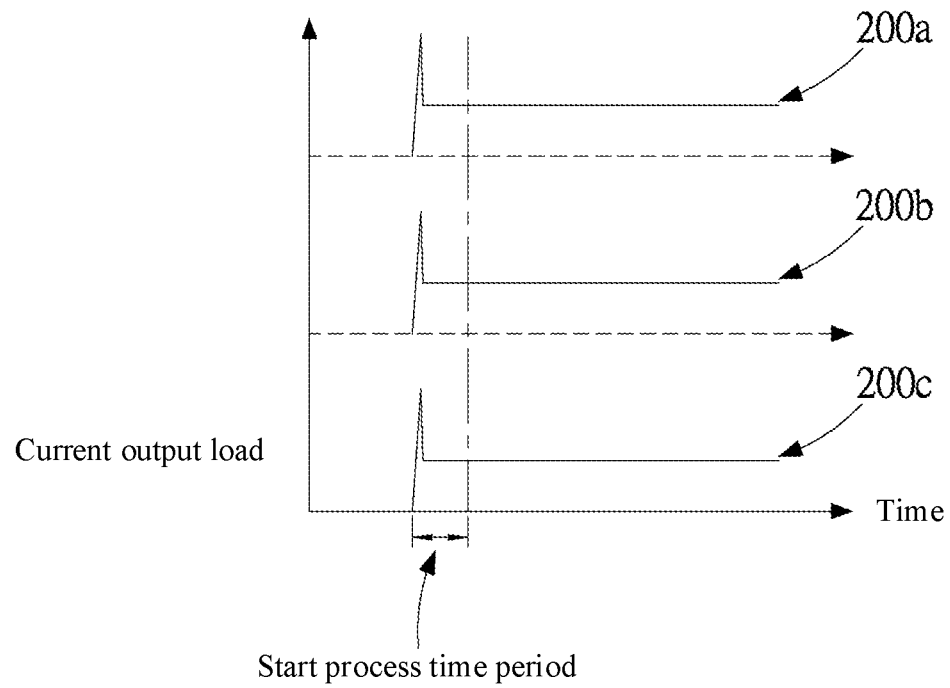
Figure 8B:
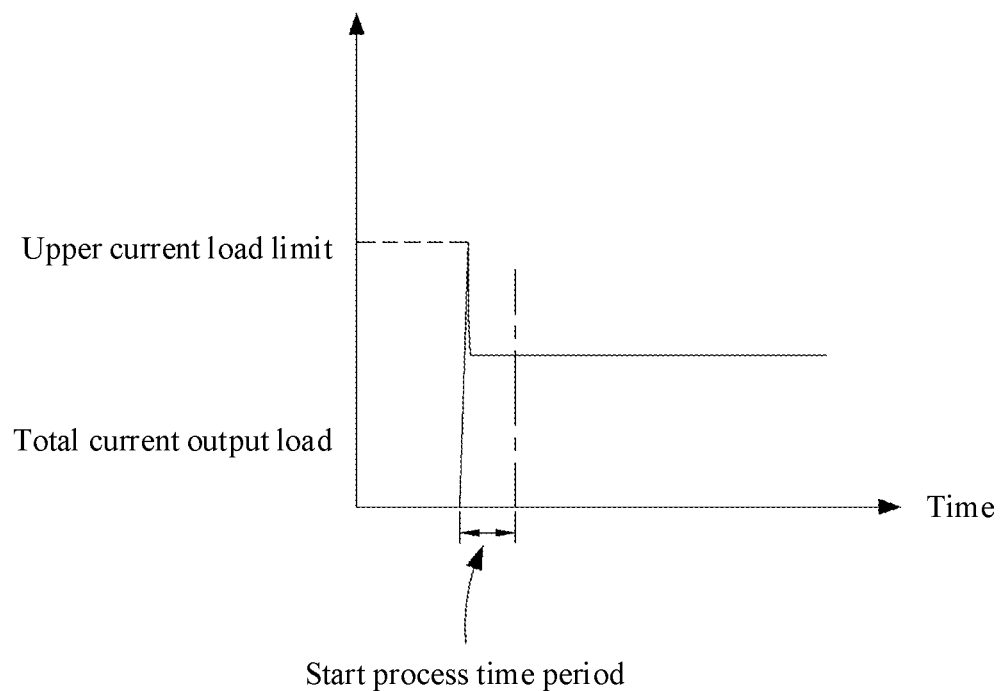
FIG. 8B shows a total current output load generated by all of the electric devices simultaneously performing the start process.
Figure 8C:
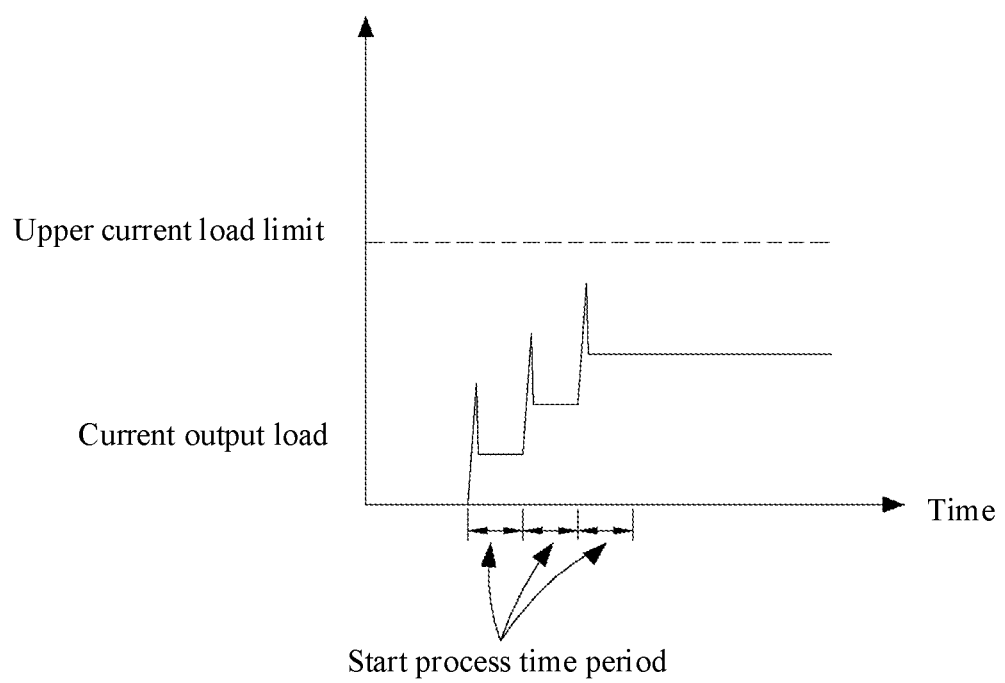
FIG. 8C shows the total current output load generated by the electric device sequentially performing the start process.

FIG. 8A, FIG. 8B, and FIG. 8C are schematic diagrams of output currents of the power supply system 300. FIG. 8A shows a current output load generated by the power supply system 300 after the first electric device 200a, the second electric device 200b, and the third electric device 200c each are turned on. FIG. 8B shows a total current output load generated by all of the electric devices 200a, 200b, and 200c simultaneously performing the start process after the power supply system 300 starts to supply the external power P. FIG. 8C shows a total current output load generated by the electric devices 200a, 200b, and 200c sequentially performing the start process as a result of the switching between the power switch devices 100a, 100b, and 100c.

As shown in FIG. 8A, when the electric device 200a, 200b, 200c performs the start process, a high peak usually occurs in the output current of the power supply system. As shown in FIG. 8B, if the electric device 200a, 200b, 200c simultaneously performs the start process, the high peaks generated by the electric device 200a, 200b, 200c may overlap, causing an instantaneous output current of the power supply system 300 to exceed an upper current load limit of the power supply system 300. In this case, the power supply system 300 performs overcurrent shutoff protection, and the power supply system 300 is turned off to stop outputting the external power P. The start process of the electric device 200a, 200b, 200c is interrupted due to a power failure, which is likely to cause damage. In addition, if there are other electric devices 200a, 200b, 200c operating normally at this time, the electric devices 200a, 200b, 200c would be turned off abnormally, causing operating interruption, data loss, and hardware damage.

As shown in FIG. 8C, if switching is performed according to the power switch device 100a, 100b, 100c of the instant disclosure, the electric devices 200a, 200b, and 200c sequentially start process, and then high peaks of the output currents generated by the electric devices 200a, 200b, and 200c occur at different occasions without overlapping, reducing a probability that the instantaneous output current of the power supply system 300 exceeds the upper current load limit, and effectively avoiding the loss as a result of enabling of the overcurrent shutoff protection.

Figure 9:
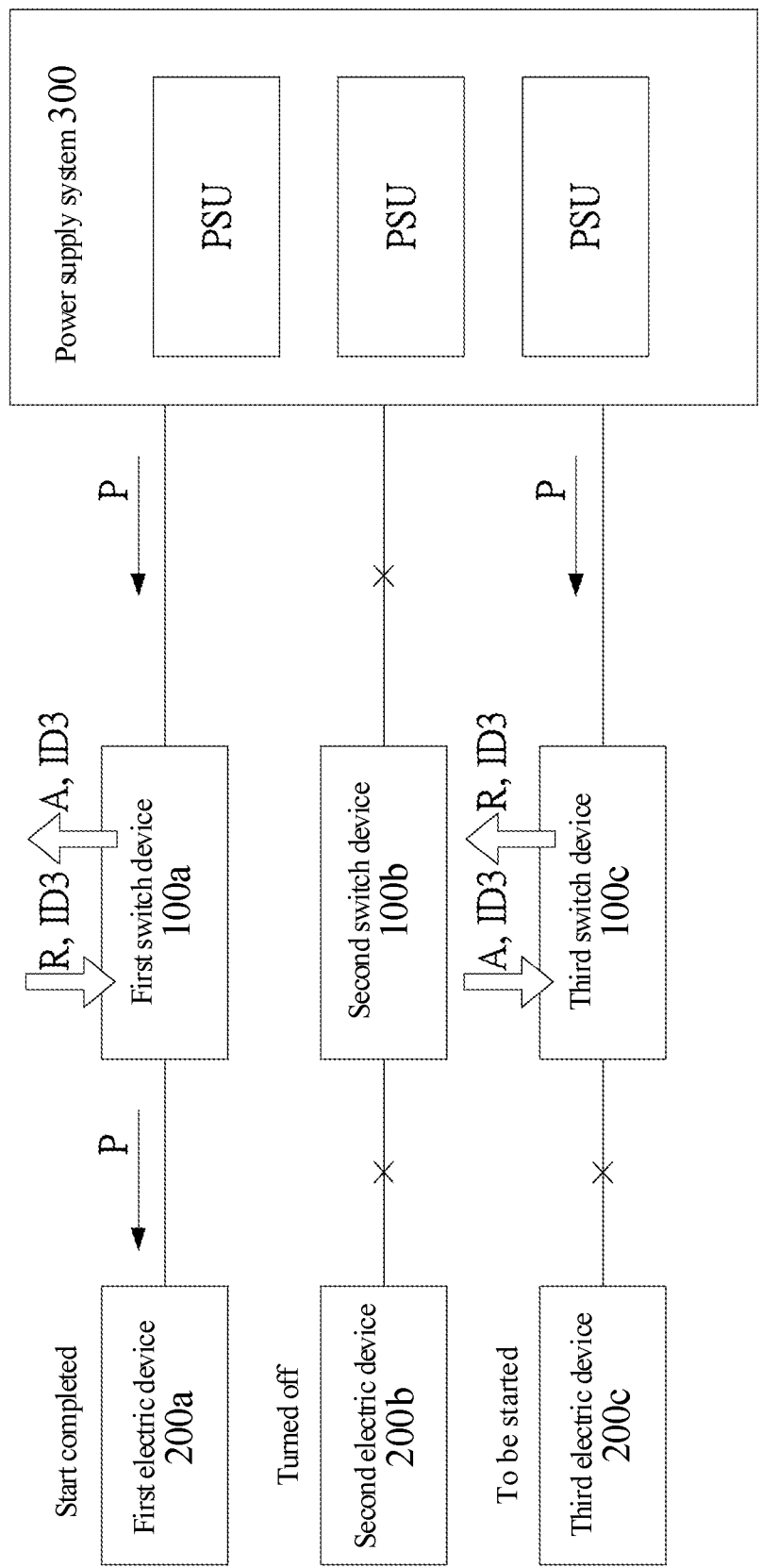
FIG. 9 is a schematic diagram of switching a connection status of the power switch device according to a second embodiment of the instant disclosure.
Figure 10:
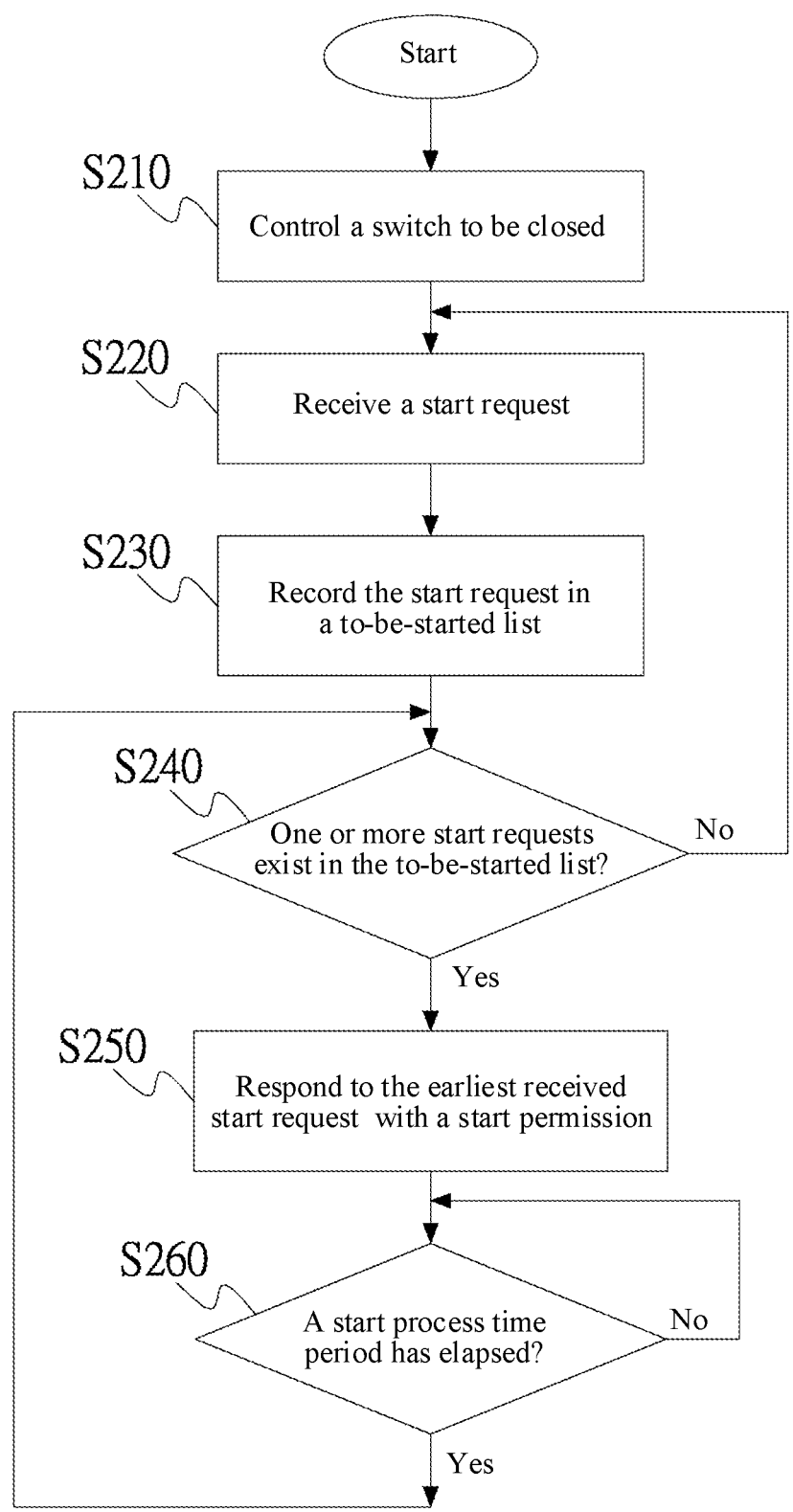
FIG. 10 is a flowchart of control steps of the power switch device as a controlling device according to the second embodiment of the instant disclosure.

FIG. 9 and FIG. 10 show a power switch device 100a, 100b, 100c disclosed in the second embodiment of the instant disclosure, which is electrically connected to a power supply system 300. The power switch device 100a, 100b, 100c is electrically connected to an electric device 200a, 200b, 200c, respectively. A circuit composition of the power switch device 100a, 100b, 100c is substantially the same as that shown in FIG. 2, and details are not described below.

Referring to FIG. 2, FIG. 9, and FIG. 10, in the second embodiment, the control unit 120 has a controlling operating mode and a controlled operating mode to switch the power switch device 100a, 100b, 100c to a controlling device or a controlled device. The first switch device 100a is used to describe the switching between the controlling operating mode and the controlled operating mode below. A message packet via the communication interface 130 may be transmitted in a manner of broadcasting. Therefore, the control unit 120 of the power switch device 100a, 100b, 100c sets a device identification code ID1, ID2, ID3 to correspond to the power switch device 100a, 100b, 100c. The device identification code ID1, ID2, and ID3 may be, but is not limited to, a physical network address (a MAC address) of the communication interface 130, an Internet protocol address (an IP address) allocated by a router, or a specified serial number recorded in firmware. The first switch device 100a is exemplified below to describe the controlling operating mode.

As shown in FIG. 9 and FIG. 10, in the controlling operating mode, the first switch device 100a is used as the controlling device to determine whether the electric devices 200b, 200c corresponding to other power switch devices 100b, 100c can perform a start process.

As shown in FIG. 2, FIG. 9, and FIG. 10, the control unit 120 of the first switch device 100a is turned on when receiving the external power P via the power input terminal 112. In this case, the control unit 120 controls the switch 110 to be closed, so that the first electric device 200a performs the start process, as shown in step S210.

As shown in FIG. 2, FIG. 9, FIG. 10, and FIG. 11, then the control unit 120 continuously receives a start request R via the communication interface 130, and records the start request R in a to-be-started list L in an order of receiving, as shown in steps S220 and S230. The above start request R includes the device identification code ID1, ID2, ID3 corresponding to the power switch device 100a, 100b, 100c. The control unit 120 of the first switch device 100a checks the to-be-started list L, and determines whether one or more start requests R are recorded in the to-be-started list L, as shown in step S240.

Figure 11:
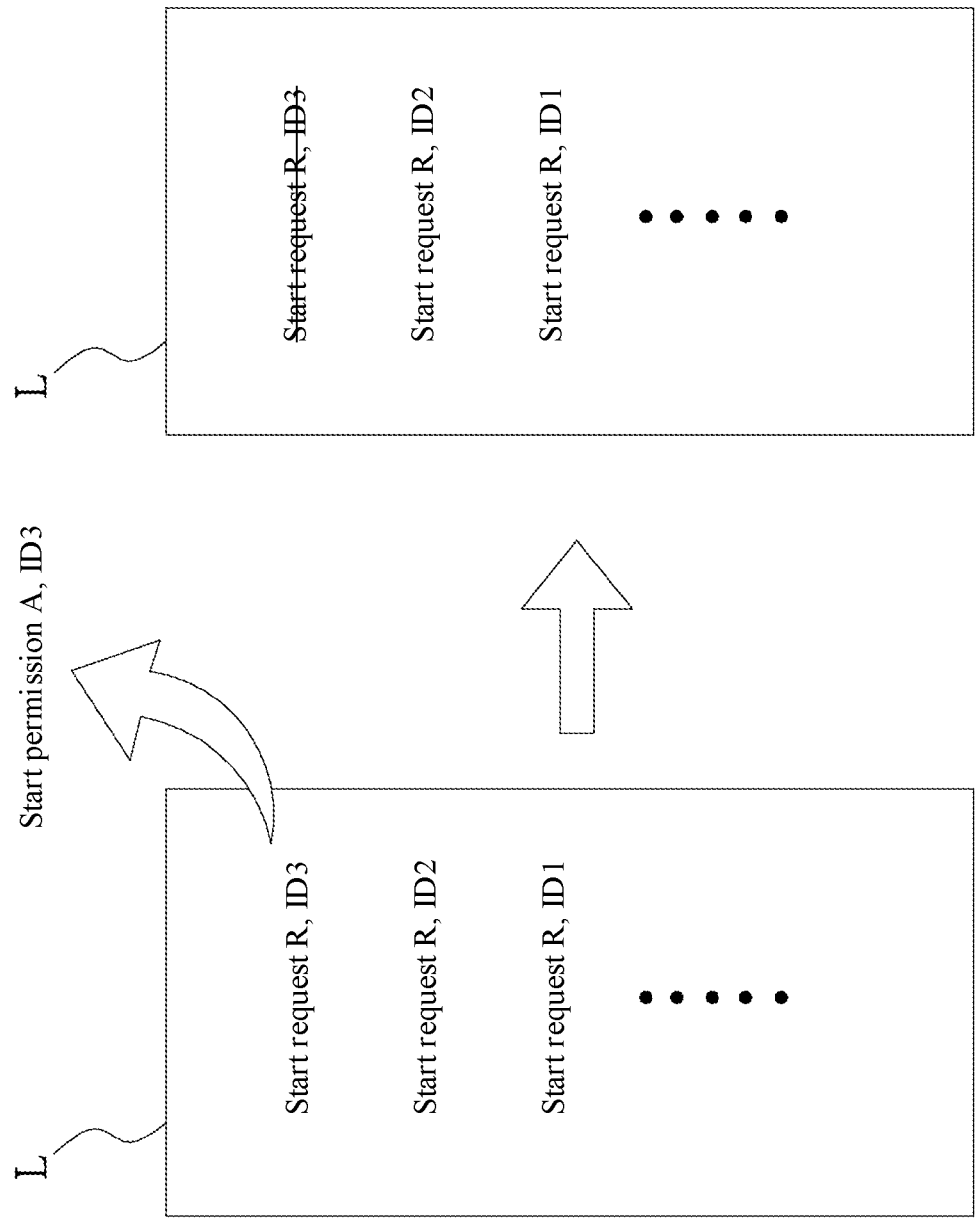
FIG. 11 is a schematic diagram of a to-be-started list according to the second embodiment of the instant disclosure.

As shown in FIG. 2, FIG. 10, and FIG. 11, if one or more start requests R exist in the to-be-started list L, the control unit 120 generates a corresponding start permission A according to the earliest received start request R. The control unit 120 responds to the earliest received start request R with the start permission A via the communication interface 130, and deletes the earliest received start request R, as shown in step S250. The above start permission A includes the device identification code ID3 corresponding to the earliest received start request R. Then the control unit 120 sets a start process time period. Within the start process time period, the control unit 120 no longer transmits the start permission A, as shown in step S260. In this case, the controlled device that receives the start permission A performs the start process, and no other controlled device receives the start permission A to perform the start process within the start process time period.

A same site may simultaneously include a plurality of different groups composed of power switch devices 100a, 100b, 100c connected to different power supply units. In order to avoid mutual interference of the start requests R between different groups, a group list may be set in advance to record a plurality of preset device identification codes. The preset device identification codes correspond to the device identification codes ID1, ID2, and ID3 of the power switch devices 100a, 100b, and 100c. In the controlling operating mode, the control unit 120 loads the group list in advance. After the communication interface 130 receives the start request R, the control unit 120 first determines whether the device identification code ID1, ID2, ID3 included in the start request R is consistent with one of the preset device identification codes. In case of inconsistency, the control unit 120 ignores the start request R and determines that the start request R is not received.

As shown in FIG. 10, after the start process time period has elapsed, the control unit 120 checks the to-be-started list again, and finds out the earliest received start request R again. The control unit 120 then transmits the start permission A accordingly to respond to the earliest received start request R, as shown in step S260 to step S240.

Figure 12:
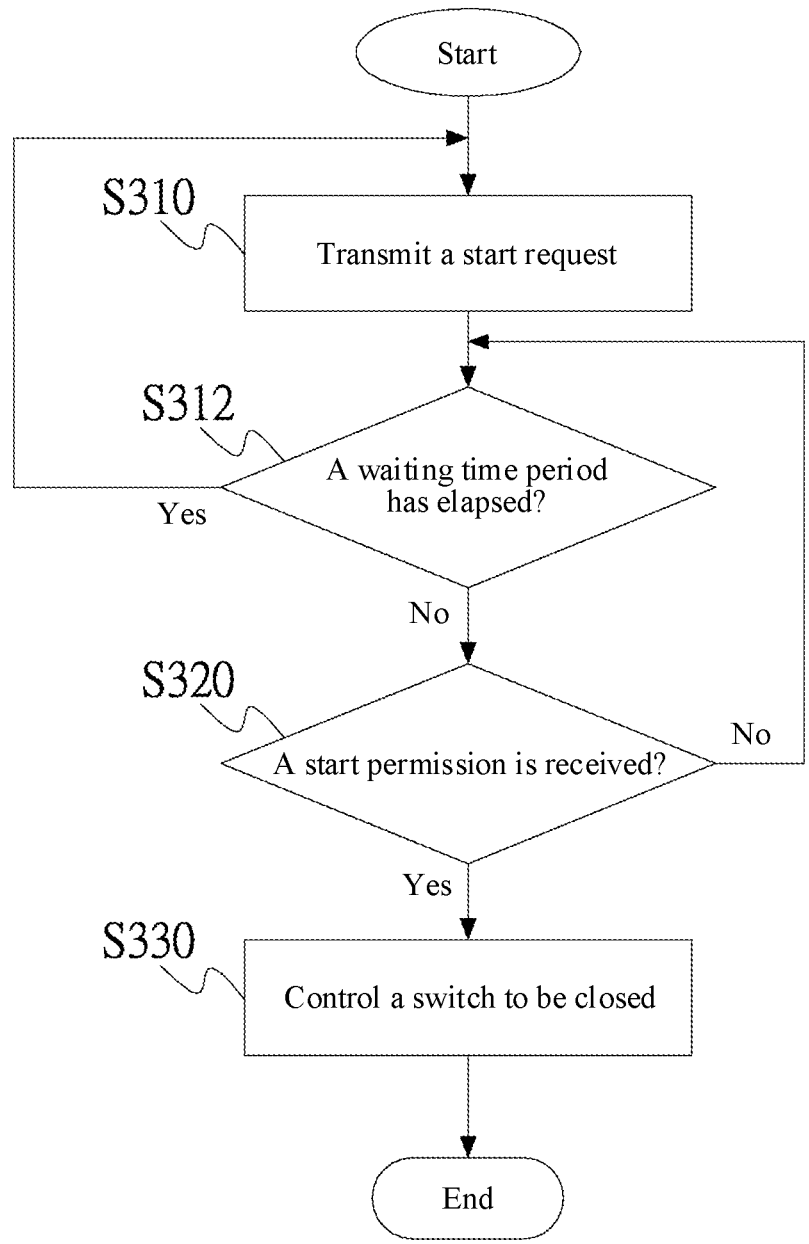
FIG. 12 is a flowchart of control steps of the power switch device as a controlled device according to the second embodiment of the instant disclosure.

As shown in FIG. 2, FIG. 9, and FIG. 12, the third switch device 100c is exemplified below to describe the controlled operating mode. In the controlled operating mode, the third switch device 100c serves as a controlled device, and the controlling device (the first switch device 100a) determines whether the corresponding third electric device 200c can perform the start process.

As shown in FIG. 2, FIG. 9, and FIG. 12, the control unit 120 of the third switch device 100c is turned on when receiving the external power P via the power input terminal 112. In this case, the switch 110 still normally remains open. Next, the control unit 120 generates a start request R, and adds the device identification code ID3 to the start request R. The control unit 120 transmits the start request R via the communication interface 130 and waits, as shown in step S310.

As shown in FIG. 2 and FIG. 12, after the communication interface 130 of the third switch device 100c receives the start permission A including the device identification code ID3, the control unit 120 controls the switch 110 to be closed, so that the external power P is transmitted to the third electric device 200c, and the third electric device 200c performs the start process, as shown in steps S320 and S330. Since the start permission A transmitted by the controlling device may be transmitted to other controlled devices, the control unit 120 needs to determine, when receiving the start permission A via the communication interface 130, whether the start permission A includes the device identification code ID3. If the device identification code ID3 is not included in the start permission A, the start permission A is not a response to the command of the third switch device 100c, and the control unit 120 ignores the start permission A and determines that the start permission A is not received.

As shown in FIG. 2, FIG. 9, and FIG. 12, the start request R transmitted by the third switch device 100c may not be received by the controlling device due to a transmission failure. Therefore, in the controlled operating mode, after the communication interface 130 transmits the start request R, the control unit 120 determines whether the communication interface 130 receives the start permission A within a waiting time period. If the start permission A is not received within the waiting time period, the control unit 120 retransmits the start request R via the communication interface 130, as shown in step S312.

In the second embodiment, the switching between the controlling operating mode and the controlled operating mode is used to determine whether the power switch device 100a, 100b, 100c serves as the controlling device or the controlled device. One of the plurality of power switch devices 100a, 100b, and 100c is specified as the controlling device, and the rest is used as the controlled device. Therefore, the control unit 120 of the power switch device 100a, 100b, 100c (for example, the first switch device 100a) that is switched to the controlling operating mode directly controls the switch 110 to be closed after energized and turned on, so that the first electric device 200a performs the start process and completes the start. The control unit 120 waits for the communication interface 130 to receive the start request R after completing the start. The controlling device is selected depending on a usage status of the electric device 200a, 200b, 200c. For example, if the first electric device 200 is to be turned on earliest in an overall electric structure or continuously remains in a power-on state, the control unit 120 of the first switch device 100a may be set to the controlling operating mode, so that the first switch device 100a serves as the controlling device.

Figure 13:
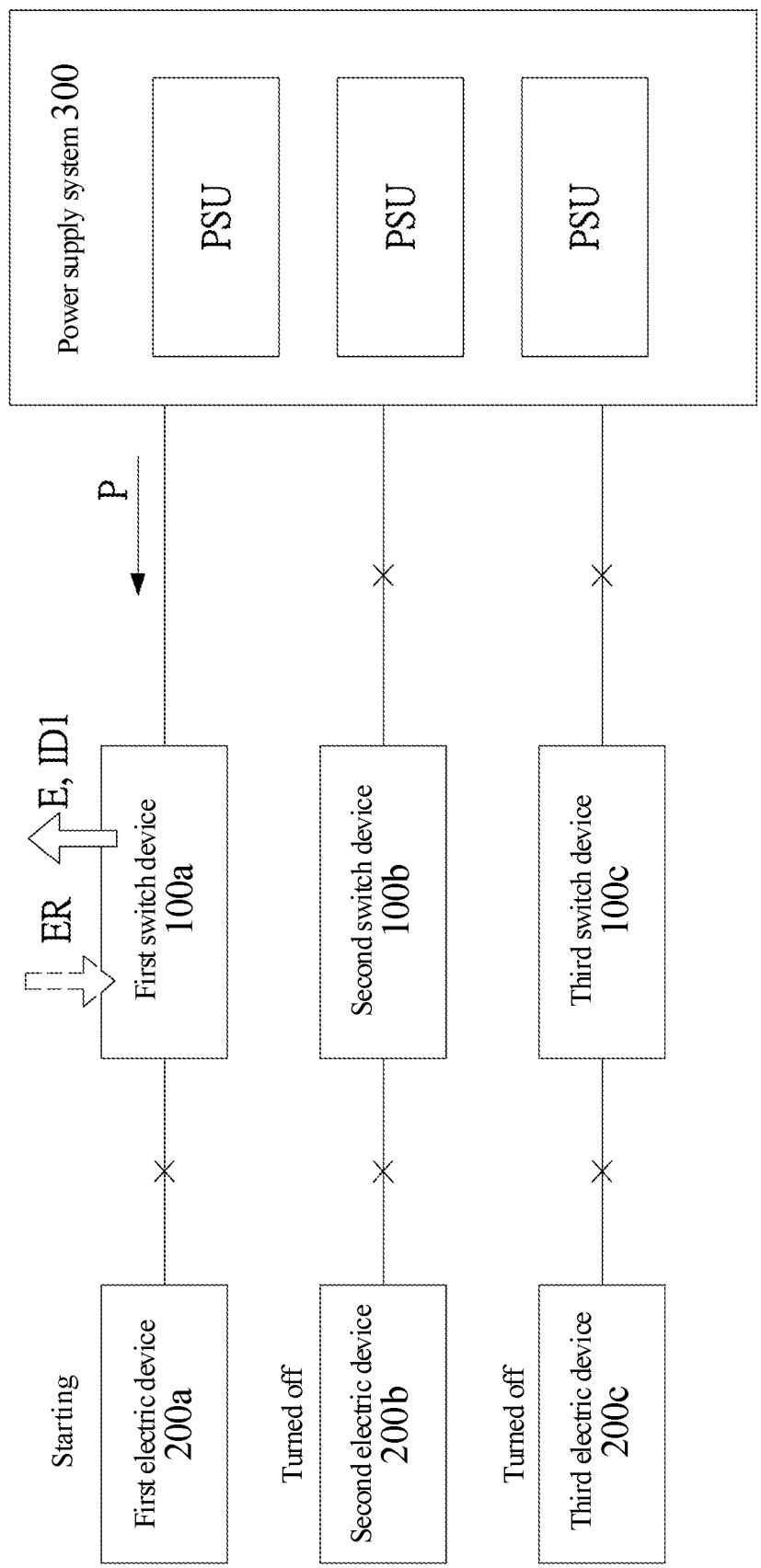
FIG. 13 is a schematic diagram of the power switch device switched to a controlling operating mode according to the second embodiment of the instant disclosure.

As shown in FIG. 2 and FIG. 13, another way is not specifying the controlling device and the controlled device in advance. The first switch device 100a is also exemplified. The control unit 120 of the first switch device 100a is turned on when receiving the external power P via the power input terminal 112. In this case, the switch 110 still normally remains open.

Then the control unit 120 of the first switch device 100a transmits an existence inquiry E via the communication interface 130 and determines whether an existence response ER corresponding to the existence inquiry is received. If the existence response ER is not received, the other power switch devices 100b, 100c are not energized and turned on, and the corresponding electric devices 200b, 200c are also turned off. In this case, the control unit 120 of the first switch device 100a is switched to the controlling operating mode, so that the first switch device 100a serves as the controlling device.

Figure 14:
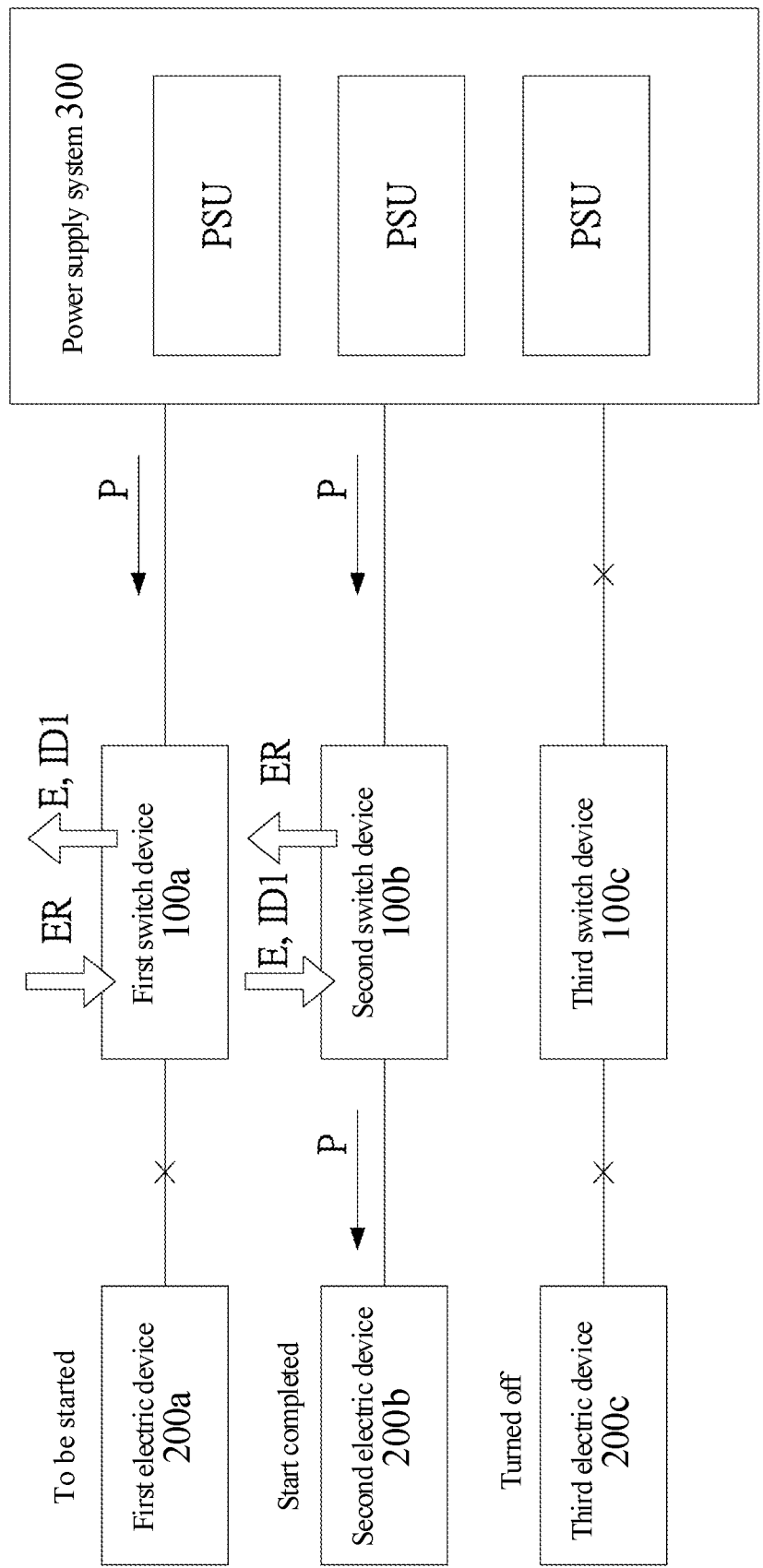
FIG. 14 is a schematic diagram of the power switch device switched to a controlled operating mode according to the second embodiment of the instant disclosure.

As shown in FIG. 2 and FIG. 14, one of the other power switch devices 100b, 100c is energized and turned on and switched to the controlling operating mode to serve as the controlling device. The second switch device 100b is exemplified as the controlling device. The communication interface 130 of the second switch device 100b receives the existence inquiry E transmitted by the first switch device 100a, and the control unit 120 of the second switch device 100b transmits the existence response ER via the communication interface 130. After receiving the existence response ER via the communication interface 130, the control unit 120 of the first switch device 100a is switched to the controlled operating mode, so that the first switch device 100a serves as the controlled device.

In order to avoid interference between adjacent groups, the control unit 120 of the power switch device 100a, 100b, 100c adds the device identification code ID1, ID2, ID3 of the power switch device to the existence inquiry E. The control unit 120 of the controlling device determines whether the device identification code ID1, ID2, ID3 included in the received existence inquiry E is consistent with one of the preset device identification codes. In case of consistency, the control unit 120 determines that the existence inquiry E is received. In case of inconsistency, the control unit 120 ignores the existence inquiry E and determines that the existence inquiry E is not received.

Similarly, the control unit 120 of the controlling device adds the device identification codes ID1, ID2, ID3 of the power switch device to the existence response ER. The control unit 120 of the controlled device determines whether the received device identification code ID1, ID2, and ID3 of the existence response ER is consistent with one of the preset device identification codes. In case of consistency, the control unit 120 determines that the existence response ER corresponding to the existence inquiry is received. In case of inconsistency, the control unit 120 ignores the existence response ER and determines that the existence response ER is not received.

In one or more embodiments of the instant disclosure, a plurality of power switch devices are sequentially turned on at an appropriate time interval (during a start process time period), so that each corresponding electric device can be turned on sequentially not simultaneously. Therefore, the power switch device of the instant disclosure can prevent the instantaneous output current of the power supply system from exceeding the upper current load limit, thereby preventing the power supply system from performing overcurrent shutoff protection. The plurality of power switch devices are turned on through collaborative operation, so that there is no need to dispose a centralized management device additionally, which can simplify the composition of a power management architecture. In addition, the power switch device can be quickly added to or removed from an existing group of power switch devices, which facilitates deployment and configuration of the electric device.

What is claimed is:

1. A power switch device, comprising:
a switch comprising a power input terminal and a power output terminal, wherein the power input terminal is configured to receive an external power, the power output terminal is configured to output the external power, and the switch normally remains open;
a control unit electrically connected to the power input terminal and the switch and configured to control the switch to be open or closed, wherein the control unit is turned on when receiving the external power via the power input terminal, and the control unit is configured to generate a start request; and
a communication interface electrically connected to the control unit and configured to transmit the start request and receive a busy message; wherein
after the communication interface transmits the start request, the control unit determines whether the busy message is received within a delay time period; if the busy message is not received within the delay time period, the control unit controls the switch to be closed and sets a start process time period; and within the start process time period, if the communication interface receives another start request, the control unit generates another busy message to respond to the another start request via the communication interface.

2. The power switch device according to claim 1, wherein the control unit generates the start request after receiving a power-on command via the communication interface.

3. The power switch device according to claim 1, wherein if the communication interface receives the busy message within the delay time period, the control unit retransmits the start request via the communication interface.

4. The power switch device according to claim 3, wherein after the busy message is received, and after waiting for a waiting time period, the control unit retransmits the start request via the communication interface.

5. The power switch device according to claim 4, wherein the waiting time period is greater than one-half of the start process time period and is not greater than two-thirds of the start process time period.

6. The power switch device according to claim 1, further comprising a power conversion circuit electrically connected to the power input terminal, wherein the control unit and the communication interface are indirectly electrically connected to the power input terminal via the power conversion circuit, and the power conversion circuit is configured to convert the external power to a power type required by the control unit and the communication interface.

7. A power switch device, comprising:
a switch comprising a power input terminal and a power output terminal, wherein the power input terminal is configured to receive an external power, the power output terminal is configured to output the external power, and the switch normally remains open;
a control unit electrically connected to the power input terminal and the switch and configured to control the switch to be open or closed, wherein the control unit is turned on when receiving the external power via the power input terminal, and the control unit comprises a controlling operating mode and a controlled operating mode; and
a communication interface electrically connected to the control unit; wherein
in the controlling operating mode, the control unit determines whether the communication interface receives a start request, after the start request is received, the control unit responds with a start permission via the communication interface and sets a start process time period, and if another start request is received within the start process time period, the control unit does not respond to the another start request; and wherein
in the controlled operating mode, the control unit transmits the start request via the communication interface and controls the switch to be closed after the start permission is received.

8. The power switch device according to claim 7, wherein in the controlling operating mode, the control unit controls the switch to be closed.

9. The power switch device according to claim 7, wherein in the controlling operating mode, the control unit continuously receives a plurality of start requests via the communication interface and records the start requests in a to-be-started list in an order of receiving, and the control unit generates the corresponding start permission according to the earliest received start request, responds to the earliest received start request with the start permission, and deletes the earliest received start request.

10. The power switch device according to claim 7, wherein in the controlled operating mode, after the communication interface transmits the start request, the control unit determines whether the communication interface receives the start permission within a waiting time period, and if the start permission is not received within the waiting time period, the control unit retransmits the start request via the communication interface.

11. The power switch device according to claim 7, wherein the control unit sets a device identification code, in the controlled operating mode, the control unit adds the device identification code to the start request, when the start permission is received, the control unit determines whether the start permission comprises the device identification code, and if the device identification code is not comprised, the control unit ignores the start permission and determines that the start permission is not received.

12. The power switch device according to claim 11, wherein the control unit loads a group list, a plurality of preset device identification codes are recorded in the group list, in the controlling operating mode, the control unit determines whether the device identification code comprised in the start request is consistent with one of the preset device identification codes, and in case of inconsistency, the control unit ignores the start request and determines that the start request is not received.

13. The power switch device according to claim 12, wherein after the control unit is turned on when receiving the external power via the power input terminal, the control unit transmits an existence inquiry via the communication interface and determines whether an existence response corresponding to the existence inquiry is received, and if the existence response is not received, the control unit is set to the controlling operating mode.

14. The power switch device according to claim 13, wherein in the controlling operating mode, the communication interface receives the existence inquiry, and the control unit transmits the existence response via the communication interface.

15. The power switch device according to claim 14, wherein the control unit adds the device identification code to the existence inquiry; in the controlling operating mode, the control unit determines whether the device identification code comprised in the received existence inquiry is consistent with one of the preset device identification codes, and in case of inconsistency, the control unit ignores the existence inquiry and determines that the existence inquiry is not received.

16. The power switch device according to claim 14, wherein in the controlling operating mode, the control unit adds the device identification code to the existence response; and in the controlled operating mode, the control unit determines whether the device identification code comprised in the existence response is consistent with one of the preset device identification codes, and in case of inconsistency, the control unit ignores the existence response and determines that the existence response is not received.

17. The power switch device according to claim 7, further comprising a power conversion circuit electrically connected to the power input terminal, wherein the control unit and the communication interface are indirectly electrically connected to the power input terminal via the power conversion circuit, and the power conversion circuit is configured to convert the external power to a power type required by the control unit and the communication interface.

* * * * *